(12) United States Patent
Fu et al.

(10) Patent No.: US 12,022,148 B2
(45) Date of Patent: Jun. 25, 2024

(54) DISPLAY APPARATUS

(71) Applicant: HISENSE VISUAL TECHNOLOGY CO., LTD., Shandong (CN)

(72) Inventors: Youping Fu, Shandong (CN); Lu Miao, Shandong (CN); Kejing Lu, Shandong (CN); Yansong Fu, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 3 days.

(21) Appl. No.: 17/948,595

(22) Filed: Sep. 20, 2022

(65) Prior Publication Data
US 2023/0017626 A1 Jan. 19, 2023

Related U.S. Application Data

(63) Continuation of application No. PCT/CN2021/098825, filed on Jun. 8, 2021.

(51) Int. Cl.
H04N 21/43 (2011.01)
H04N 21/431 (2011.01)
H04N 21/443 (2011.01)
H04N 21/485 (2011.01)

(52) U.S. Cl.
CPC ..... *H04N 21/4312* (2013.01); *H04N 21/4438* (2013.01); *H04N 21/485* (2013.01)

(58) Field of Classification Search
None
See application file for complete search history.

(56) References Cited

U.S. PATENT DOCUMENTS

| 2007/0024733 A1* | 2/2007 | Denpo | H04N 23/63 |
| | | | 386/E5.07 |
| 2008/0229257 A1 | 9/2008 | White | |
| 2011/0246916 A1* | 10/2011 | Leskela | G06F 3/0488 |
| | | | 345/173 |

(Continued)

FOREIGN PATENT DOCUMENTS

| CN | 102467398 A | 5/2012 |
| CN | 104391877 A | 3/2015 |

(Continued)

*Primary Examiner* — Tapas Mazumder
(74) *Attorney, Agent, or Firm* — Meunier Carlin & Curfman LLC

(57) ABSTRACT

Provided are display apparatuses. A display apparatus includes: a display, and a controller connected to the display, the controller is configured to: display a first interface on the display; in response to no operation for the first interface reaching a first time threshold, create a screensaver display interface by a screensaver application in the display apparatus, where the screensaver display interface is transparent with respect to the first interface; present the screensaver display interface on the display without blocking the first interface presented on the display; create a screensaver view comprising a plurality of screensaver interfaces by the screensaver application; and present the first screensaver interface in the screensaver view on the screensaver display interface to block the first interface, where the first access entry and the first presentation material are visible for a user and the first access entry is available for selection by the user.

18 Claims, 13 Drawing Sheets

(56) References Cited

U.S. PATENT DOCUMENTS

2019/0369860 A1* 12/2019 Purevdorj ................ G09G 3/20

FOREIGN PATENT DOCUMENTS

| | | |
|---|---|---|
| CN | 104469529 A | 3/2015 |
| CN | 105991726 A | 10/2016 |
| CN | 106227542 A | 12/2016 |
| CN | 106406891 A | 2/2017 |
| CN | 107193944 A | 9/2017 |
| CN | 111954059 A | 11/2020 |
| JP | 2006120058 A | 5/2006 |

* cited by examiner

DISPLAY APPARATUS

CROSS-REFERENCE OF RELATED APPLICATIONS

This application is a continuation application of PCT Application No. PCT/CN2021/098825, filed on Jun. 8, 2021, which claims the priorities of Chinese Patent Application No. 202010628028.5, filed on Jul. 2, 2020, and No. 202010835502.1, filed on Aug. 19, 2020, all of them are incorporated herein by reference.

FIELD

This application relates to the technical field of display apparatuses.

BACKGROUND

With the development of smart TVs, the smart TVs have more and more functions and richer content, which is becoming the development trend of TV in the future.

In some scenarios, if the user leaves the display apparatus, the display apparatus will not receive a key input for a long time, causing the display screen to remain stationary for a long time. For this reason, a screensaver application can be installed on the display apparatus. Through the screensaver application, the display screen can automatically enter the screensaver state when the display screen is stationary for a certain period of time, and can automatically exit the screensaver state when the display screen is activated.

SUMMARY

Embodiments of the present application provide a display apparatus, including: a display; a communicator, configured to communicate data with a server, receive data sent from the server, and send data to the server; and a controller, connected with the display, where the controller is configured to: in response to not receiving an operation instruction for an interface within a certain period of time, start a screensaver application, and present a local screensaver image in a local screensaver image library on the display; Send a theme and a data type of a picture gallery to which the local screensaver image belongs according to the local screensaver image to a server; detect whether there is recommendation data that corresponds to the theme and the data type of the picture gallery to which the local screensaver image belongs, where the recommendation data is recommendation data send from the server according to the theme and the data type of the picture gallery to which the local screensaver image belongs; and in response to that there is the recommendation data, control the display to display the recommendation data; and in response to that there is no recommendation data, control the display to display a next screensaver image in the local screensaver image library.

A second aspect of embodiments of the present application provide a some screensaver display method, including: in response to not receiving an operation instruction for an interface within a certain period of time, starting a screensaver application, and presenting a local screensaver image in a local screensaver image library on the display; sending a theme and a data type of a picture gallery to which the local screensaver image belongs according to the local screensaver image to the server; detecting whether there is recommendation data that corresponds to the theme and the data type of the picture gallery to which the local screensaver image belongs, where the recommendation data is recommendation data send from the server according to the theme and the data type of the picture gallery to which the local screensaver image belongs; and in response to that there is the recommendation data, controlling the display to display the recommendation data; and in response to that there is no recommendation data, controlling the display to display a next screensaver image in the local screensaver image library.

DETAILED DESCRIPTION OF THE EMBODIMENTS

In order to make the purpose and embodiments of this application clearer, the embodiments of this application will be clearly and completely described below in combination with the accompanying drawings in embodiments of this application. Obviously, embodiments described are only some, but not all of the embodiments.

It should be noted that the brief description of terms in this application is only for the convenience of understanding the embodiments described next, and is not intended to limit the embodiments of this application. Unless indicated otherwise, these terms shall be understood in accordance with their plain and ordinary meanings.

Figure 1:
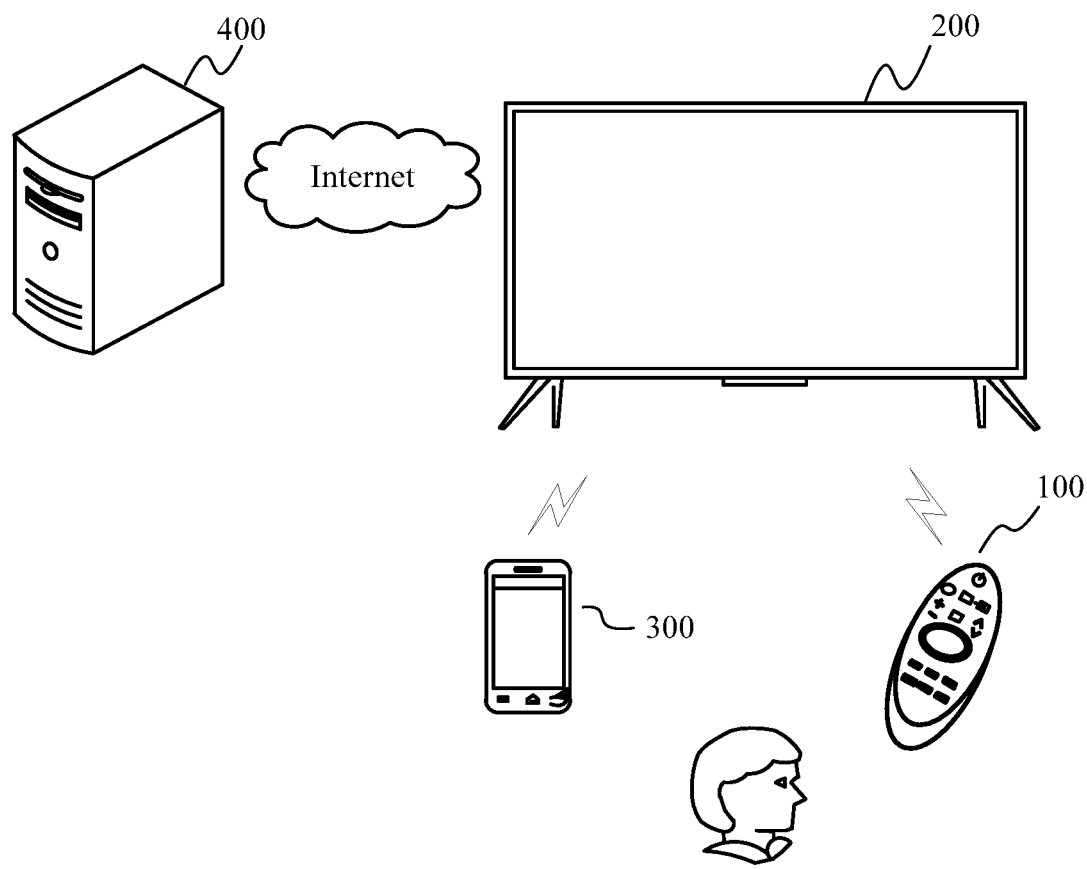
FIG. 1 provides a schematic diagram of a scenario between a display apparatus and a control device according to some embodiments.

FIG. 1 is a schematic diagram of a scenario between a display apparatus and a control device according to some embodiments. As shown in FIG. 1, a user may operate the display apparatus 200 through a smart device 300 or the control device 100.

The control device 100 may be a remote control, the communication of the remote control and the display apparatus includes infrared protocol communication or Bluetooth protocol communication, and other short-range communication means, to control the display apparatus 200 by a wireless or wired means. The user may input commands through keys on the remote control, voice input, control panel input, and the like to control the display apparatus 200.

In some embodiments, the smart device 300, such as a mobile terminal, a tablet, a computer, a laptop, etc., may also be used to control the display apparatus 200. For example, the display apparatus 200 is controlled by using an application running on the smart device.

In some embodiments, the display apparatus 200 can also be controlled in a way other than the control device 100 and the smart device 300. For example, the user's voice instruction control can be directly received through the module for obtaining voice commands configured inside the display apparatus 200, or the user's voice command can be received through the voice control device set outside the display apparatus 200.

In some embodiments, the display apparatus 200 is also in data communication with the server 400. The display apparatus 200 may be in communication connection with other networks through a local area network (LAN), a wireless local area network (WLAN), and other networks. The server 400 may provide various content and interactions for the display apparatus 200.

Figure 2:
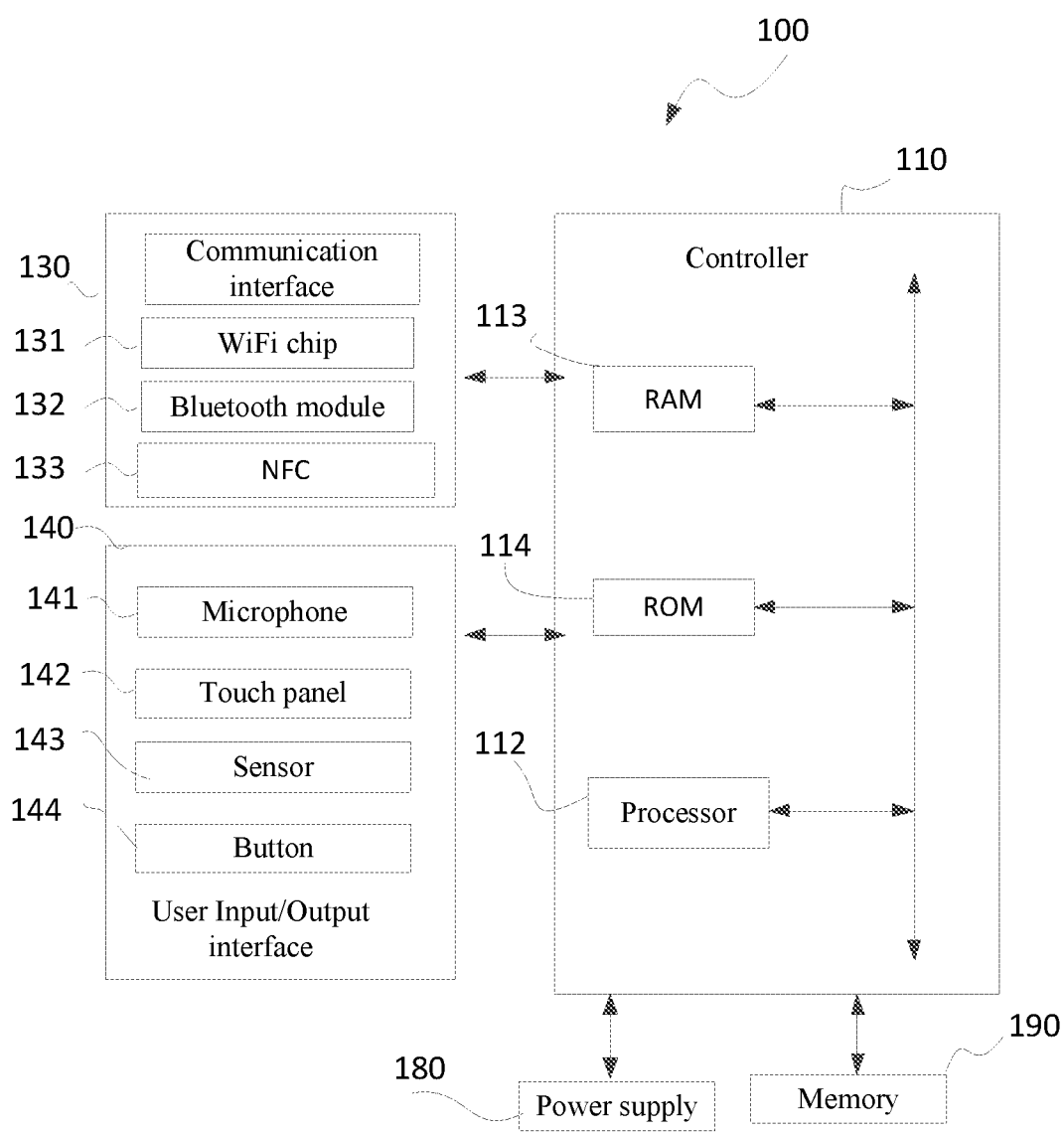
FIG. 2 provides a hardware configuration block diagram of the display apparatus 200 according to some embodiments.

FIG. 2 shows a configuration block diagram of the control device 100 according to some embodiments. As shown in FIG. 2, the control device 100 includes a controller 110, a communication interface 130, a user input/output interface 140, a memory, and a power supply. The control device 100 may receive an input command from the user, and convert the command into an instruction that the display apparatus 200 may recognize and respond to, thus playing an interactive intermediary role between the user and the display apparatus 200.

Figure 3:
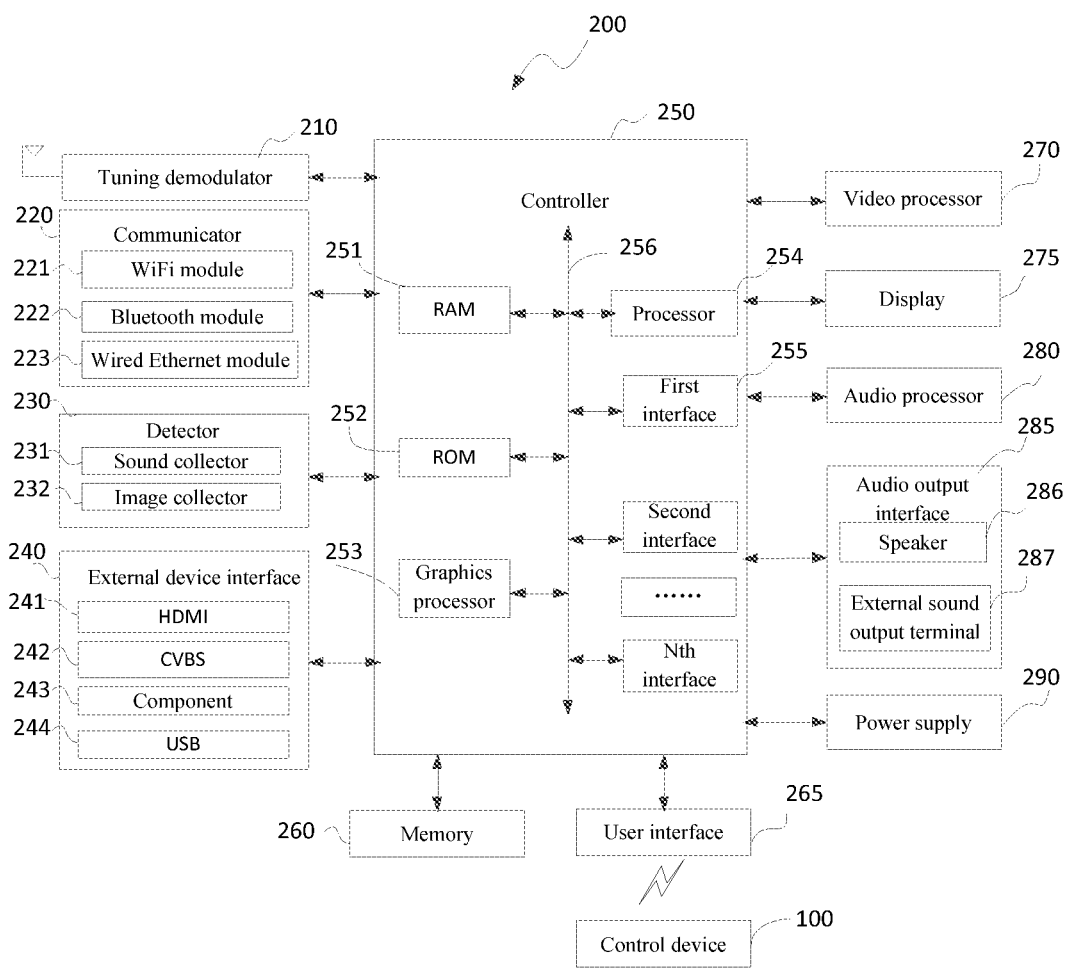
FIG. 3 provides a hardware configuration block diagram of the control device 100 according to some embodiments.

FIG. 3 shows a hardware configuration block diagram of the display apparatus 200 according to some embodiments.

The display apparatus 200 includes at least some of a tuning demodulator 210, a communicator 220, a detector 230, an external device interface 240, a controller 250, a display 260, an audio output interface 270, a memory, a power supply, a user interface.

The display 260 includes a panel component for presenting images, and a drive component for driving display of images, a component for receiving image signals output from the controller, displaying video content, image content, and a menu manipulation interface, and a user manipulation UI interface.

The display 260 may be a liquid crystal display, an OLED display, and a projection display, as well as some projection apparatuses and projection screens.

The communicator 220 is a component for communicating with an external device or the server according to various communication protocols. For example, the communicator may include at least some of a Wifi module, a Bluetooth module, a wired Ethernet module, and other network communication protocol chips or near field communication protocol chips, and an infrared receiver. The display apparatus 200 may establish transmission and reception of control signals and data signals with the external control device 100 or the server 400 through the communicator 220.

The user input interface may be configured to receive control signals from the control device 100 (e.g., an infrared remote control, etc.).

The detector 230 is used to collect the external environment or signals interacting with the outside. For example, the detector 230 includes a light receiver which is a sensor for collecting the intensity of ambient light; alternatively, the detector 230 includes an image collector, such as a camera, which can be used to collect external environment scenes, user attributes or user interaction gestures, or the detector 230 includes a sound collector, such as a microphone, for receiving external sound.

The external device interface 240 may include, but is not limited to, any one or more interfaces such as a high-definition multimedia interface (HDMI), an analog or data high-definition component input interface (component), a composite video input interface (CVBS), a USB input interface (USB), an RGB port, etc. It can also be a composite input/output interface formed by the above plurality of interfaces.

The controller 250 and the tuning demodulator 210 can be located in different individual devices, that is, the tuning demodulator 210 can also be located in an external device of a main device where the controller 250 is located, such as an external set-top box.

The controller 250 controls the operation of the display apparatus and responds to the operation of the user through various software control programs stored in the memory. The controller 250 controls the overall operation of the display apparatus 200. For example, in response to receiving a user command for selecting to display a UI object on the display 260, the controller 250 may perform operations related to the object selected by the user command.

The object can be any one of the optional objects, such as a hyperlink, an icon, or other operable controls. The operations related to the selected object include: the operation of displaying connection to a hyperlink page, a document, an image, etc., or launching an application corresponding to the icon.

In some embodiments, the user can input a command on the graphical user interface (GUI) on the display 260, and the user input interface receives the user command through the graphical user interface (GUI). Alternatively, the user can input the user command by inputting a specific voice or gesture, and the user input interface recognizes the voice or gesture through the sensor to receive the user input command.

In some embodiments, the system may include a kernel, a shell, a file system, and one or more applications. The kernel, shell and file system together form the basic operating system structure, which allows the user to manage files, run programs and use the system. After power on, the kernel is started, activates the kernel space, abstracts hardware, initializes hardware parameters, etc., and runs and maintains a virtual memory, a scheduler, signals, and interprocess communication (IPC). After the kernel is started, the shell and applications are loaded. After the applications are started, they are compiled into machine codes to form processes.

In some scenarios, if the user leaves the display apparatus, the display apparatus cannot receive a key input for a long time, causing the display screen to remain the same for a long time, which is not good to the service life of the display screen and will waste power. In order to prolong the service life of the display screen and save power, a screensaver application can be installed on the display apparatus. Through the screensaver application, the display screen can automatically enter the screensaver state when the display screen maintains no operation state for a certain period of time, and can automatically exit the screensaver state when the display screen is activated so as to protect the screen and save power.

Figure 4:
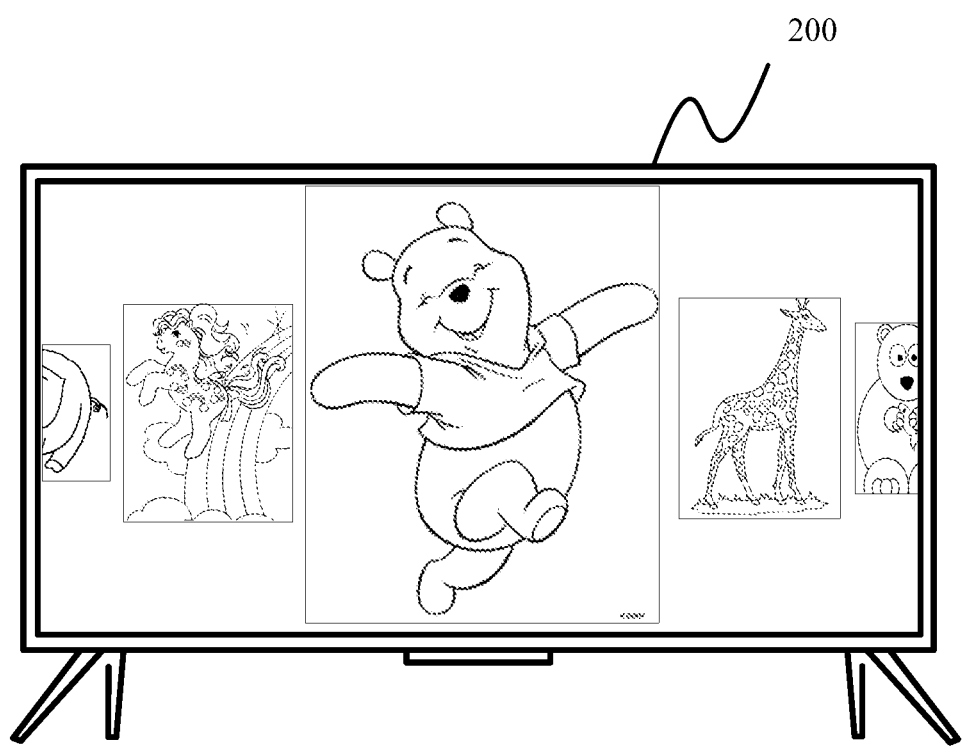
FIG. 4 provides a schematic diagram of a display screen entering a screensaver state according to an embodiment of the present disclosure.

In some embodiments, FIG. 4 shows a schematic diagram of the display screen entering the screensaver state. In this case, the display no longer presents a stationary user interface, but presents multimedia screensaver information provided by the screensaver application. The multimedia screensaver information is generally dynamic information, thus enriching the diversity of viewing of the user on the screensaver interface. In some embodiments, if it is an OLED display, the purpose of protecting the screen is also achieved. For example, as shown in FIG. 4, a plurality of images are scrolled on the screen, and each image is presented on the screen for the same length of time.

In the above scenario, if the user returns to the display apparatus and uses the remote control to operate the display apparatus, the display screen will immediately exit the screensaver state shown in FIG. 4, and the display will no longer present multimedia screensaver information, but present the user interface.

However, in view of the above scenario, although the screensaver application can avoid the long-time stationary state of the screen, the current screensaver display is based on the local single picture gallery, or the advertising operation can only configure an advertisement as a screensaver according to the latest resources, and cannot configure personalized screensaver resources according to the preferences of user, nor can it realize the interspersed display of advertisements and picture gallery images, hence, the preferences of user cannot be met, and the user experience needs to be improved.

Embodiments of the application provide a display apparatus. The local screensaver images can be selected according to the combination of type, theme, color, age, gender, etc. when the user selects one or more specific screensaver combinations, the server can send relevant types of screensaver resources to the local device according to the type of the screensaver combination selected by the user, so as to realize the function of displaying server resources and local images as screensaver content. The user can not only play the local image as a screensaver, but also obtain the screensaver resources related to the local image from the server according to the content of the local image, which enriches the user's view.

Figure 5:
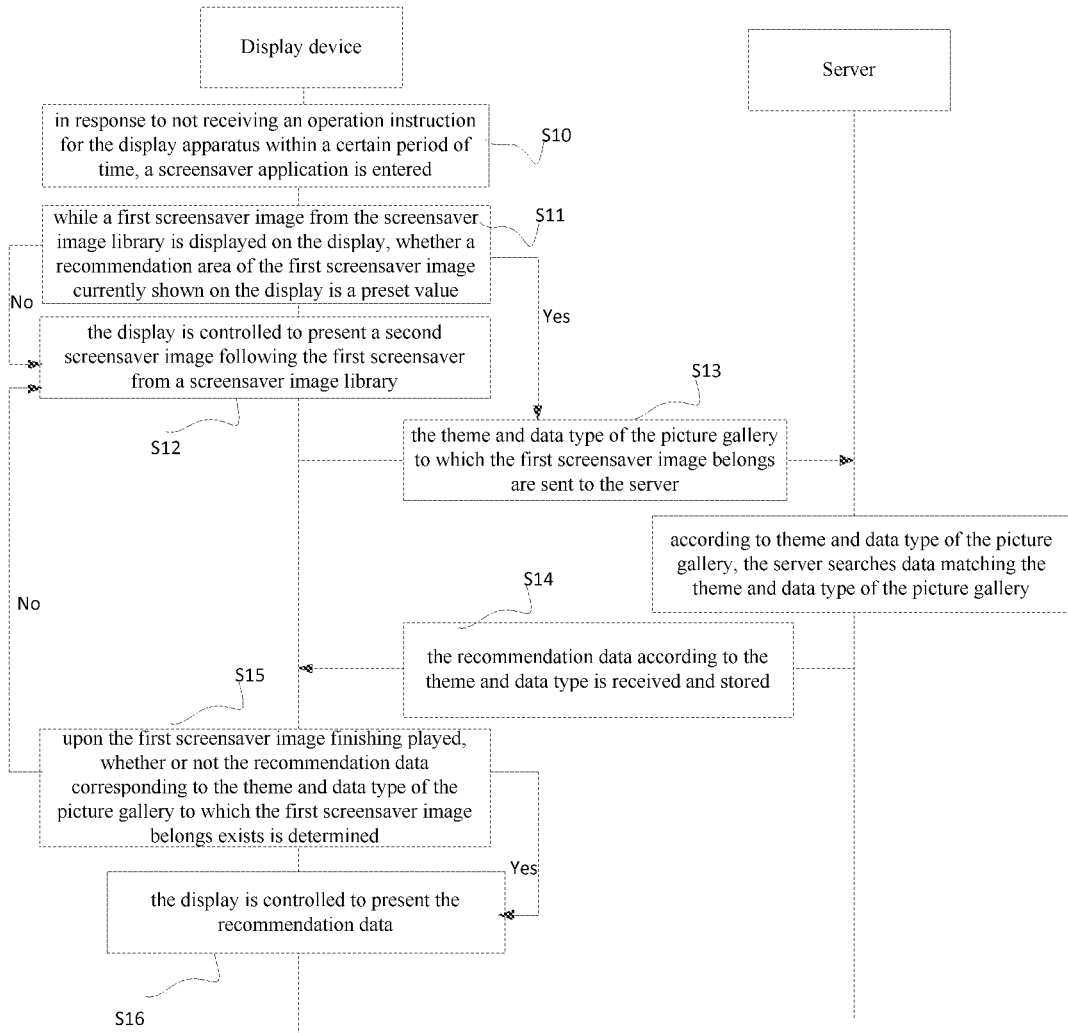
FIG. 5 provides a flowchart of an embodiment of a method performed by the display apparatus of the present application.

FIG. 5 is a schematic diagram illustrating an interaction between the display apparatus and the server.

In some embodiments, the display apparatus is configured to perform the following steps.

S10: in response to not receiving an operation instruction for the display apparatus within a certain period of time, a screensaver application is entered.

In some embodiments, when no operational instruction is received within certain time, the screensaver application is started, a local screensaver in a local screensaver image library is presented on the display; according to a local screensaver image, a theme and a data type of a picture gallery to which the screensaver image belongs are sent to the server.

In some embodiments, in S11, while a first screensaver image from the screensaver image library is displayed on the display, whether a recommendation area of the first screensaver image currently shown on the display is a preset value.

Once the screensaver application is started, while displaying the current screensaver image, whether the recommendation position of the current screensaver image is a preset value is determined. The specific information of the recommendation position (adCode) of the screensaver image can be stored in a list of detailed resources. For example, the code of the recommendation position is 0, which means that the recommendation position is void, that is, there is no resource recommendation for the current screensaver image, and then the flow goes to step S12; if the code of the recommendation position is 1, it is determined that the current screensaver image has resource recommendation, and then the flow goes to step S13. The current screensaver image is an image from a picture gallery which associates with a theme and data type.

S12: the display is controlled to present a second screensaver image following the first screensaver from a screensaver image library.

S13: the theme and data type of the picture gallery to which the first screensaver image belongs are sent to the server.

Upon detecting that the recommendation position of the current screensaver image is a preset value, the theme and the data type of the picture gallery to which the current screensaver image belongs may be acquired from the list of detailed resources, and the acquired information may be transmitted to a server. The list of detailed resources stores the picture gallery to which the screensaver image belongs, a resource URL, a recommendation position, a data type, an image type, an image size, and the like.

In some embodiments, picture galleries of three or more categories such as car, child, tour are stored in the screensaver image library of the display apparatus, and specific information of screensaver images in each picture gallery is stored in the list of detailed resources. The recommendation position is used to indicate whether the screensaver image has recommendation data to be pushed; the data type is used to indicate the data type of the recommendation data. For example, 1 indicates the recommendation data with an image resolution of 1080p, 2 indicates the recommendation data with an image resolution of 702p, 3 indicates the recommendation data in picture form, 4 indicates the recommendation data in video form, and 5 indicates the recommendation data in 3D animation form. It is noted that it is not limited to the above identification types. The recommendation data in this embodiment can be advertisements. The recommendation data is not limited to advertisements, but also data uploaded by the user.

According to theme and data type of the picture gallery, the server searches data matching the theme and data type of the picture gallery. If there is corresponding recommendation data, the recommendation data will return to the display apparatus. For example, if the theme of the picture gallery is car, the server searches the relevant data associated with car from a recommendation database, and then filters the data from the relevant data according to the data type to obtain data that meets the data type requirement. For example, the data type requires the recommendation data with a resolution of 1080p, and the data that meets the image resolution is filtered from the data associated with car theme to form a recommendation data list and then the list is sent to the display apparatus.

The recommendation data list stores the URL of the recommendation data and page options when the recommendation data is played (such as page skipping, zooming), etc.

S14: the recommendation data according to the theme and data type is received and stored.

The above recommendation data may be stored in a list of recommendation data and its index is the theme and data type of the picture gallery to which the screensaver image belongs.

The flow will not go to step S14 if no matching data is found at the server.

S15: upon the first screensaver image finishing played, whether or not the recommendation data corresponding to the theme and data type of the picture gallery to which the first screensaver image belongs exists is determined.

The display apparatus may set play duration for each screensaver image on the display, where each screensaver image has default play duration, e.g., 10 s by default. If the server specifies the play duration of the screensaver image, the display apparatus will perform displaying of the screensaver image in accordance with the specification of the server, and if the screensaver image is a video, the play duration is configured to be the duration of the video.

When the current screensaver image arrives, whether there is recommendation data under the theme and data type of the picture gallery to which the current screensaver image belongs is checked. If so, the flow goes to step S16, otherwise, the flow goes to step S12.

S16: the display is controlled to present the recommendation data.

According to the recommendation data information in the list of recommendation data, the recommendation data is played one by one, and then, after playing of the recommendation data is completed, the display is controlled to a next screensaver image in the screensaver image library in the way of step S11.

In some embodiments, in order to enable the server to control the number of times the recommendation data is played, the embodiment also sets that after controlling the display to play the recommendation data, the recommendation data corresponding to the theme and data type of the picture gallery to which the screensaver image belongs should be deleted, that is, each time the screensaver application needs to play the recommendation data, the recommendation data needs to be temporarily obtained from the server.

In this way, when displaying the screensaver, not only the screensaver image may be presented, but also the recommendation data related to the type of the screensaver image may be presented, thus increasing the diversity of resources. In addition, if the currently displayed screensaver resource is the screensaver subscribed by the user, the server side can issue the user's preferred recommendation resources according to the screensaver data subscribed by the user, thereby increasing the exposure of the recommendation data.

In some embodiments, for the current screensaver, only some types can be displayed, that is, the screensaver display is based on display of one picture gallery, and the display content is a single picture gallery: if a default picture gallery is selected, only the images in the default picture gallery can be displayed; if a picture gallery of user-uploaded images is selected, only the images uploaded by the user in the picture gallery can be shown; if a picture gallery configured background is downloaded and selected, only the content of the picture gallery can be displayed. That is, if the user wants to show the content of a plurality of picture galleries, the current screensaver cannot realize it.

Figure 6:
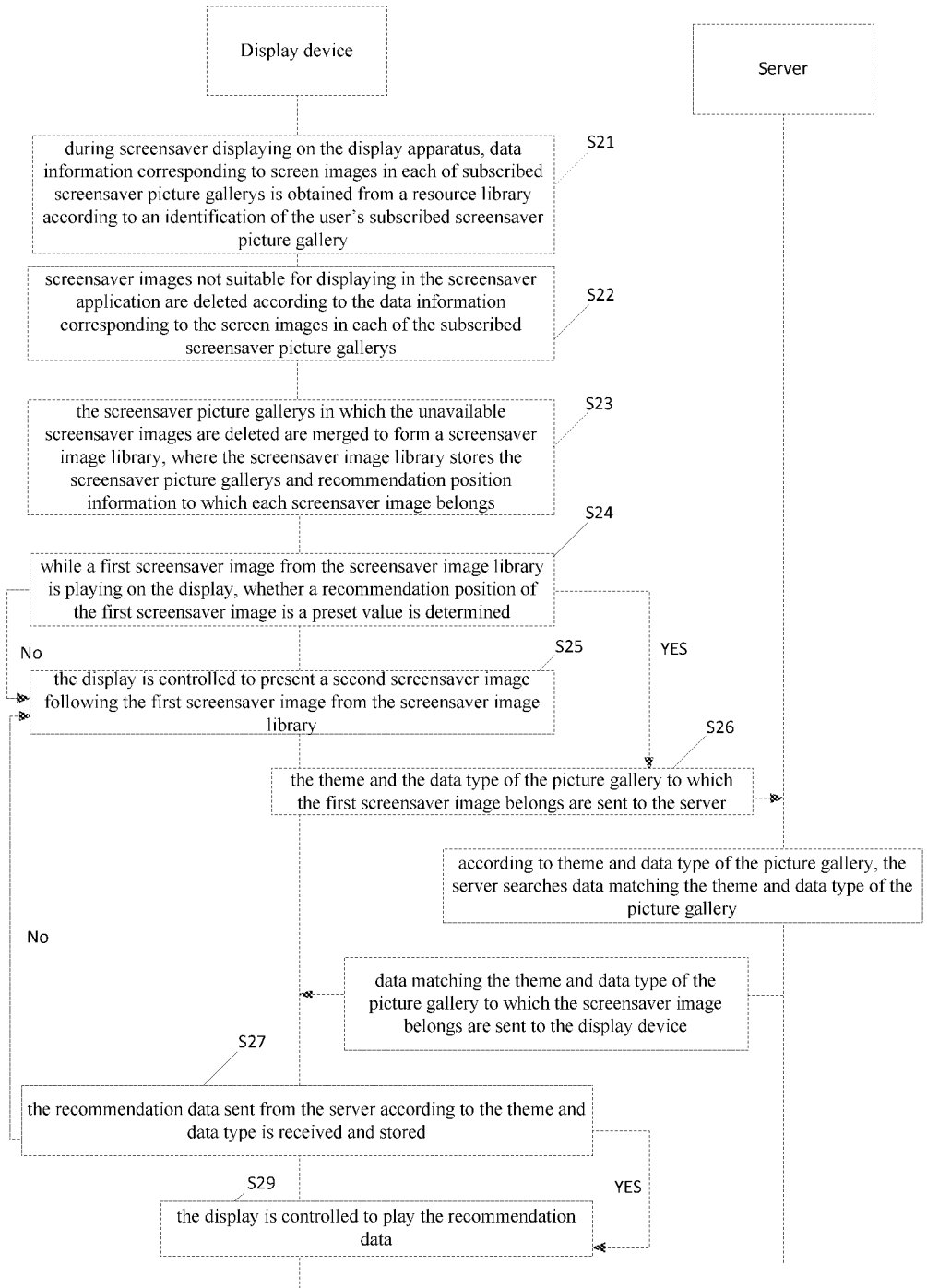
FIG. 6 provides a flowchart of another embodiment of the method performed by the display apparatus of the present application.

The present embodiments also provide a display apparatus. As shown in FIG. 6, the display apparatus is configured to perform the following steps.

S21: during screensaver displaying on the display apparatus, data information corresponding to screen images in each of subscribed screensaver picture galleries is obtained from a resource library according to an identification of the user's subscribed screensaver picture gallery.

After the display apparatus is powered on each time, the network is reconnected, or a request for screensaver picture gallery data is sent to the server side regularly, and then the theme, identification and background images of each screensaver picture gallery sent from the server according to the request for screensaver picture gallery data are stored in a preset location for users to choose.

When the user wants to subscribe a picture gallery, that is, after the request for screensaver picture gallery subscription from the user is received. One or more picture galleries may be subscribed.

First, the theme and background images of each picture gallery are presented on the display. In the view display area of the display, each item indicates a picture gallery. In this embodiment, an item refers to a visual object presented in each view display area of the user interface in the display apparatus to indicate corresponding content such as an icon, a thumbnail, a video clip, etc. In some embodiments, an "item" may display an image thumbnail of a background image.

Then, the screensaver picture gallery selected by the user is taken as a subscribed screensaver picture gallery, and a request is sent to the server to obtain the data information corresponding to each screensaver image in the subscribed screensaver picture gallery according to the identification (ID) of the subscribed screensaver picture gallery. The data information corresponding to the screensaver image can include resource URL, recommendation position, data type, image type, image size, etc.

Second, the server searches the data information of screensaver picture gallery according to the identification of the subscribed picture gallery and sends the data information of the screensaver picture gallery to the display apparatus. The display apparatus stores the data information corresponding to each screensaver image in each subscribed screensaver picture gallery returned from the server in the resource library. The data information of each picture gallery can be stored in a separate data list, and the index of each data list is identified as the ID of the screensaver picture gallery. In other embodiments, it may be stored in other ways.

S22: screensaver images not suitable for displaying in the screensaver application are deleted according to the data information corresponding to the screen images in each of the subscribed screensaver picture galleries.

The data information corresponding to the corresponding screensaver image may be obtained according to the ID of the subscribed screensaver picture gallery, and then unavailable screensaver images, such as the images shielded by the user, and the images whose image formats do not meet the requirements, are deleted.

S23: the screensaver picture galleries in which the unavailable screensaver images are deleted are merged to form a screensaver image library, where the screensaver image library stores the screensaver picture galleries and recommendation position information to which each screensaver image belongs.

Then, screensaver display is performed according to the screensaver image library as follows.

S24: while a first screensaver image from the screensaver image library is playing on the display, whether a recommendation position of the first screensaver image is a preset value is determined.

If the recommendation position is a preset value, the flow goes to step S26, otherwise, the flow goes to step S25.

S25: the display is controlled to present a second screensaver image following the first screensaver image from the screensaver image library.

S26: the theme and the data type of the picture gallery to which the first screensaver image belongs are sent to the server.

S27: the recommendation data sent from the server according to the theme and data type is received and stored.

S28: upon the first screensaver image completing playing, whether or not the recommendation data corresponding to the theme and data type of the picture gallery to which the first screensaver image belongs exists in the local display apparatus is determined.

S29: the display is controlled to play the recommendation data.

The embodiments increase the diversity of screensaver resources by presenting a plurality of screensaver picture galleries, and provide the subscription function to interact with users and present relevant recommendations according to users' preferences, which in turn can be more tailored to the users' preferences.

Figure 7:
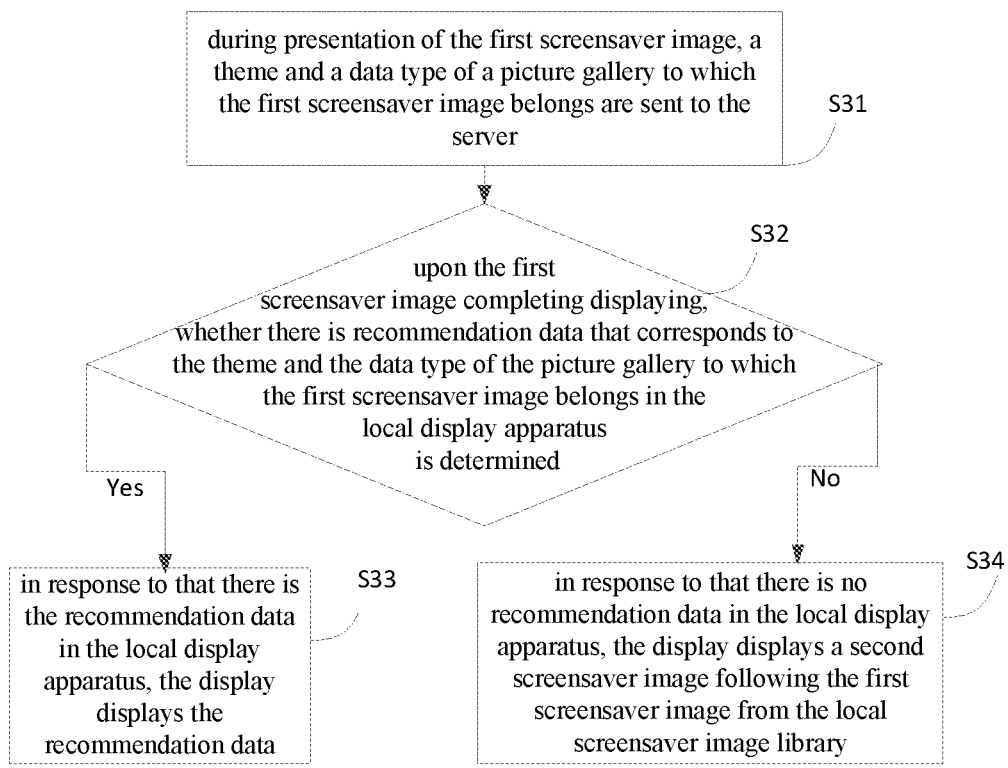
FIG. 7 provides a flowchart of displaying a screensaver according to an embodiment of the application.

The embodiments of the present application also provide a screensaver display method according to the display apparatus. As shown in FIG. 7, the method may include the following steps.

S31: during presentation of the first screensaver image, a theme and a data type of a picture gallery to which the first screensaver image belongs are sent to the server.

In some embodiments, whether information related to the first screensaver image needs to be sent to the server may be determined by detecting that the recommendation position for the first screensaver image is a preset value.

S32: upon the first screensaver image completing displaying, whether there is recommendation data that corresponds to the theme and the data type of the picture gallery to which the first screensaver image belongs in the local display apparatus is determined, wherein the recommendation data is recommendation data returned from the server according to the theme and the data type of the picture gallery to which the first screensaver image belongs.

S33: in response to that there is the recommendation data in the local display apparatus, the display displays the recommendation data.

S34: in response to that there is no recommendation data in the local display apparatus, the display displays a second screensaver image following the first screensaver image from the local screensaver image library. That is, the displaying of the second screensaver image is performed similar to step S31.

In some embodiments, the screensaver of the display apparatus is displayed in the form of presentation materials, which include images or videos. Some images or videos are configured to prompt the user to click to view details. However, when the user performs a click operation, due to the limitation of the screensaver architecture adopted by an existing Android system, when the presentation material shown on the screensaver is clicked, a phenomenon where the screensaver image first exits, and then skips to a corresponding recommended detail interface. It can be seen that in the process of screensaver exit and display of the recommended detail interface, an interface previously displayed in the display below the screensaver will appear, causing poor user experience.

The screensaver architecture described above is the Android native screensaver display mechanism. During screensaver display, the screensaver display interface inherits the screen services of the Android framework layer, and sets the screensaver display interface of the system as the screensaver customized interface. When the screensaver is to be displayed, a screen interface is called to add the customized UI interface of the screensaver to the display window of the display, so that the screensaver UI can be displayed to the user through the display window of the system. When the screensaver skips, the display of the current screensaver interface needs to exit first, and then the screensaver calls the HISDK interface to realize the skipping. The native screensaver display mechanism cannot know whether the skipping is successful, this causes the skipping to expose the previous interface on the display. The previous interface refers to an interface of an application displayed on the display prior to starting the screensaver application.

Therefore, in order to avoid exposing the previous application interface during screensaver skipping, the native screensaver display mechanism needs to be replaced, so that the screensaver can no longer be displayed through the Android native screensaver display mechanism. A display apparatus according to the embodiments of the disclosure perform display by loading an interface through the screensaver itself, so that when the screensaver skips from the screensaver image to another interface, the another interface (i.e., to be skipped interface) is displayed first, and then the screensaver display exits, so as to avoid the situation where the screensaver display exits first, resulting in the exposure of the previous application interface.

Figure 8:
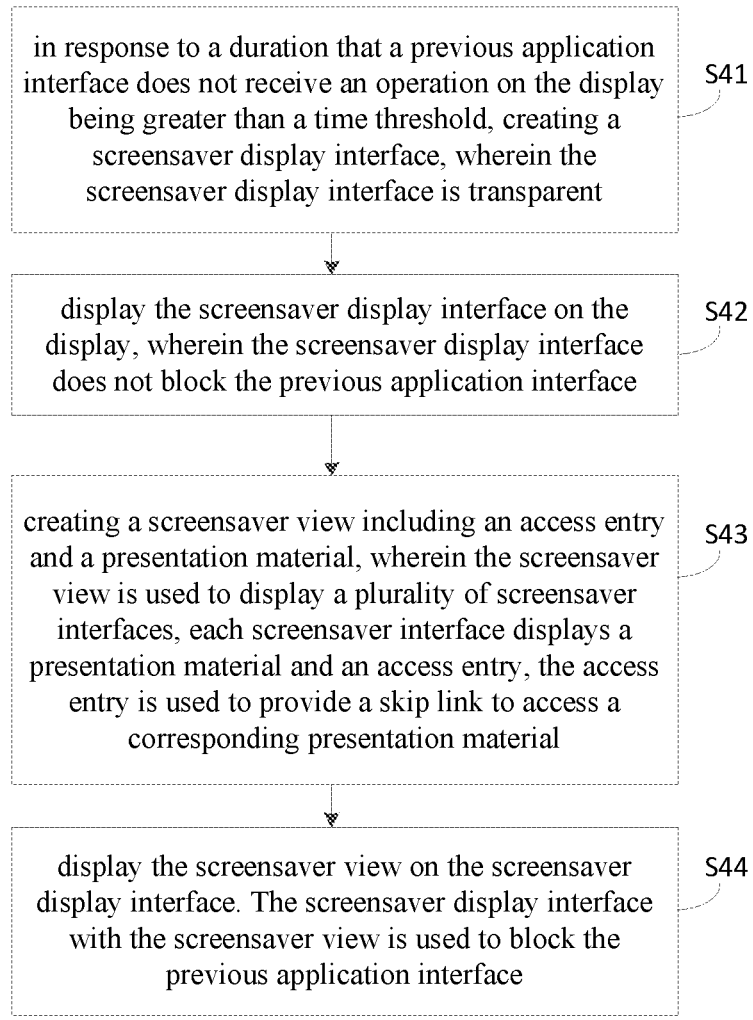
FIG. 8 provides a flowchart of a screensaver display method according to some embodiments.

FIG. 8 shows a flowchart of a screensaver display method according to some embodiments. The display apparatus according to embodiments of the present disclosure includes: a display and a controller, the display is configured to display a screensaver view; the controller is connected with the display and is configured to display screensaver views and exit from screensaver via a screensaver application. When the display apparatus performs screensaver display, the screensaver application performs the screensaver display method. Deferring to FIG. 8, the screensaver application is configured to perform the following steps.

S41: in response to a duration that a previous application interface does not receive an operation on the display being greater than a time threshold, creating a screensaver display interface, wherein the screensaver display interface is transparent.

When an application interface is displayed on the display, if there is no operation for this application interface, in order to protect the screen of the display, the display apparatus will usually enter screensaver mode. For this reason, the display apparatus needs to set the time threshold first to determine whether the duration of no operation for the application interface reaches a time threshold for starting the screensaver mode.

When the duration of no operation on the previous application is longer than the time threshold, it indicates that the screensaver mode needs to be started. In some embodiments, when the screensaver is to be displayed, the screensaver application creates a screensaver display interface. The screensaver display interface is void and transparent, that is, no view is displayed in this interface.

The screensaver display interface is created by the screensaver application itself, which is not the screensaver display interface created by the Android system based on the native screensaver mechanism.

S42: display the screensaver display interface on the display, wherein the screensaver display interface does not block the previous application interface.

When the screensaver display interface is displayed on the display, because the screensaver display interface is transparent, the previous application interface will not be blocked.

When the screensaver needs to be displayed, a corresponding view is added in the screensaver display interface, and the transparent interface is changed into an opaque interface, so as to block the previous application interface and serve as the screensaver.

S43: creating a screensaver view including an access entry and a presentation material. Wherein the screensaver view is used to display a plurality of screensaver interfaces, each screensaver interface displays a presentation material and an access entry. The access entry is used to provide a skip link to access a corresponding presentation material.

When the screensaver is displayed, the screensaver application calls a WindowManager.addView interface, adds a screensaver UI view to the display to block one or more windows at the window level presented on the display and prevent the one or more windows from being displayed above the screensaver display interface.

In some embodiments, in order to realize the view addition of the screensaver display interface, the screensaver application needs to create a screensaver view first, and the screensaver view needs to include a presentation material and an access entry. The presentation material can provide different visual effects for users, and can also recommend some product information to users; the access entry can realize access to a detail interface for the corresponding presentation material.

In order to provide different presentation materials, the screensaver view comprises a plurality of screensaver interfaces, which are displayed circularly, so that users can view new presentation materials at regular intervals. Therefore, each screensaver interface includes a presentation materials and an access entry which are in one-to-one correspondence.

Figure 9:
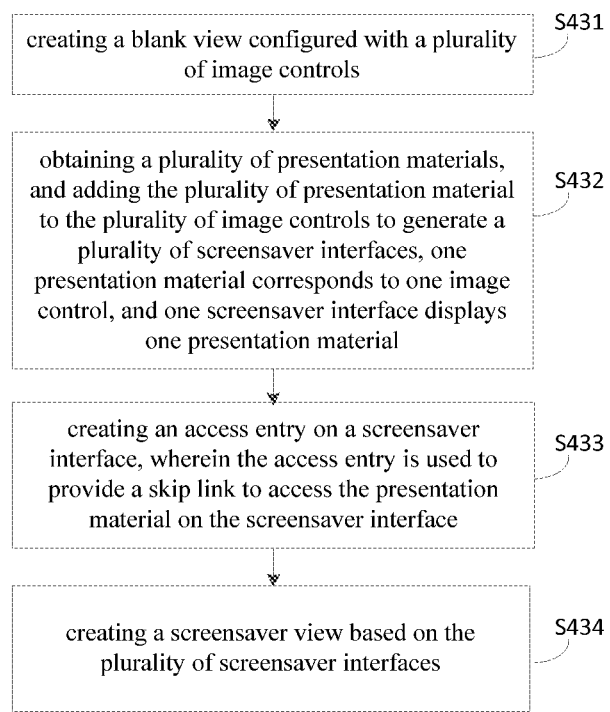
FIG. 9 provides a flowchart of a method of creating a screensaver view according to some embodiments.
Figure 10:
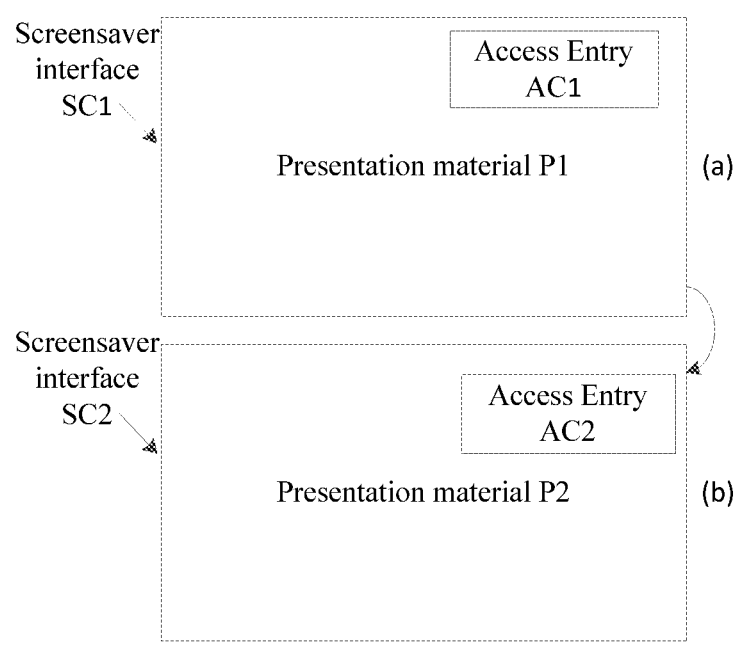
FIG. 10 provides an interface diagram for creating the screensaver view according to some embodiments.

FIG. 9 shows a flowchart of a method of creating a screensaver view according to some embodiments. An interface schematic diagram for creating a screensaver view according to some embodiments is shown in FIG. 10. Referring to FIG. 9 and FIG. 10, in some embodiments, the screensaver application is further configured to perform the following steps when performing the creation of a screensaver view including the access entry and presentation material.

S431: creating a blank view configured with a plurality of image controls.

When creating a screensaver view, the screensaver application needs to create a blank view first, and add a plurality of image controls in the blank view. The number of the image controls is the same as the number of presentation materials to be displayed.

The image control is a container for image data. In order to display different screensaver contents, the data source contained in the image control can be the system default image or presentation material.

S432: obtaining a plurality of presentation materials, and adding the plurality of presentation material to the plurality of image controls to generate a plurality of screensaver interfaces. One presentation material corresponds to one image control, and one screensaver interface displays one presentation material.

When the screensaver presentation material is needed, the presentation material needed is obtained first, the presentation material is added to the image control, and one presentation material is added to one image control to generate one screensaver interface. A plurality of presentation materials are added to a plurality of image controls to get a plurality of screensaver interfaces, and one presentation material is displayed in a screensaver interface.

In some embodiments, as shown in (a) in FIG. 10, a presentation material P1 is added to a first image control to generate a screensaver interface SC1; as shown in (b) in FIG. 10, a presentation material P2 is added to the second image control to generate a screensaver interface SC2.

S433: creating an access entry on a screensaver interface, wherein the access entry is used to provide a skip link to access the presentation material on the screensaver interface.

In order for users to quickly access the corresponding presentation materials and view the display details in the screensaver interface, an access entry needs to be generated on each screensaver interface, and the access entry can realize the rapid access to the presentation materials.

In some embodiments, as shown in (a) in FIG. 10, an access entry AC1 is created on the screensaver interface SC1, and the access entry AC1 realizes rapid access to the presentation material P1; as shown in (b) in FIG. 10, an access entry AC2 is created on the screensaver interface SC2, which realizes rapid access to the presentation material P2.

S434: creating a screensaver view based on the plurality of screensaver interfaces.

Each screensaver interface includes a corresponding presentation material and access entry, and a plurality of screensaver interfaces can generate the screensaver view.

S44: display the screensaver view on the screensaver display interface. The screensaver display interface with the screensaver view is used to block the previous application interface.

When the screensaver is displayed, the screensaver application adds the created screensaver view with the presentation materials and access entries to the screensaver display interface for display, so as to change the transparent screensaver display interface into an opaque screensaver display interface. The screensaver display interface with the screensaver view is opaque, so as to block the previous application interface shown on the display and serve as a screensaver.

Since the screensaver view comprises multiple screensaver interfaces, when displaying the screensaver view, the screensaver interfaces can be displayed periodically, that is, after the screensaver interface SC1 is displayed for a preset duration, the screensaver interface SC1 is updated with the screensaver interface SC2, and the screensaver interface SC2 is updated with a next screensaver interface after the preset duration. After completing the display of the last screensaver interface, circular display from the screensaver interface SC1 is performed again.

It can be seen that for the display apparatus according to embodiments of the disclosure, when the screensaver is displayed, the screensaver application configured in the controller creates the screensaver display interface and displays it on the display, then creates the screensaver view including the presentation materials and access entries, and adds the screensaver view to the screensaver display interface to block the previous application interface already displayed on the display. When creating the screensaver display interface, it is not necessary to call the screensaver service of the system framework layer, the screensaver display interface is created by the screensaver application itself, which can avoid a situation where it is impossible to determine whether the skipping is successful during screensaver skipping, and avoid exposing the previous application interface during screensaver skipping.

When the user clicks an access entry on a screensaver interface to view the detail interface of the corresponding presentation material based on the screensaver view displayed on the display, the display needs to skip from the screensaver view currently displaying on the display to a detail interface. In order to prevent the display from presenting the previous application interface during the screensaver skipping, the embodiments of the disclosure provide a display apparatus, including a display, a transition application and a controller.

The display is configured to display a screensaver view which is created by the screensaver application provided by the aforementioned embodiments and is used to display a plurality of screensaver interfaces. Each screensaver interface displays a presentation material and an access entry. The access entry is used to provide a skip link to access a corresponding presentation material. The transition application is an application configured to implement the skip display from the screensaver view to the display detail interface. A screensaver application is configured in the controller for displaying the screensaver view and exiting from the screensaver view.

Figure 11:
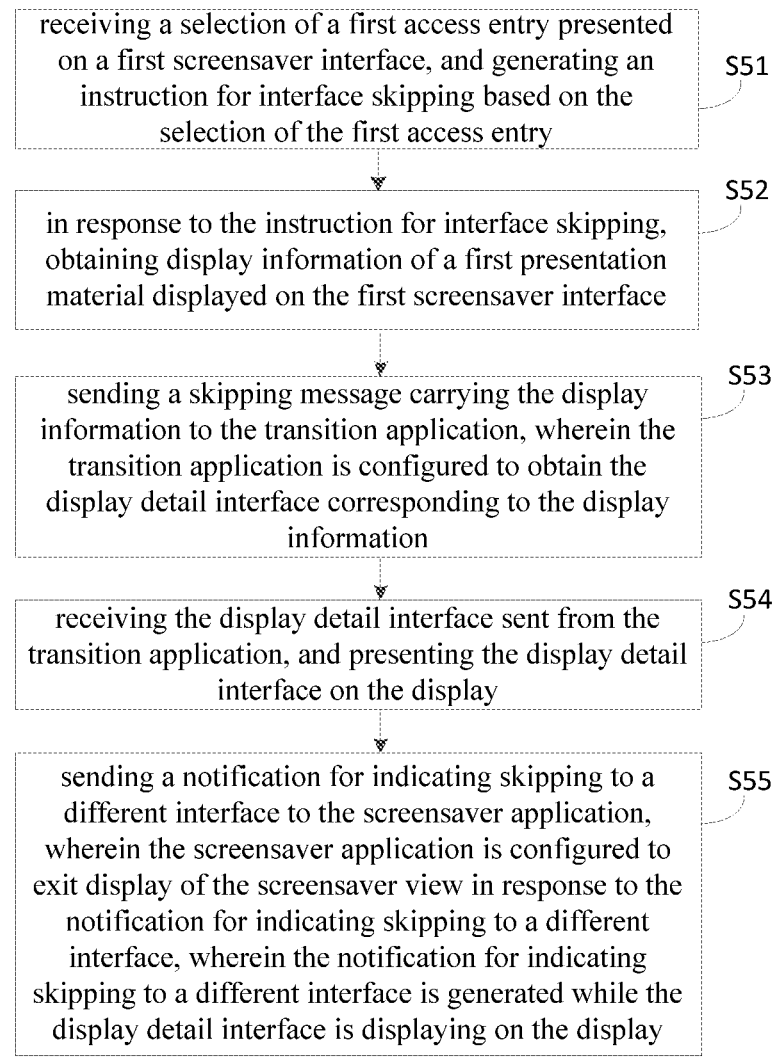
FIG. 11 provides a flowchart of a method for screensaver skipping according to some embodiments.
Figure 12:
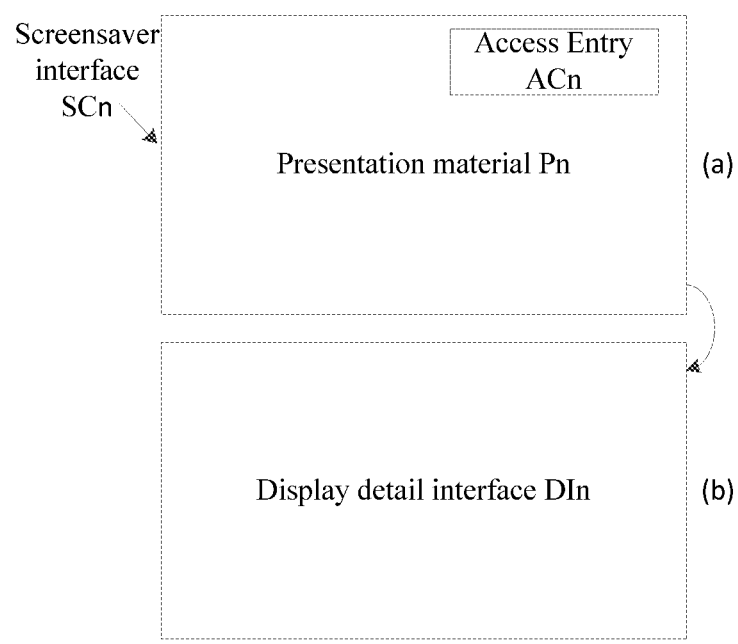
FIG. 12 provides an interface diagram for screensaver skipping according to some embodiments.

FIG. 11 shows a flowchart of a screensaver skip method according to some embodiments; and FIG. 12 shows an interface diagram of the screensaver skip method according to some embodiments. For some display apparatuses according to the embodiments of the present disclosure, when performing a screensaver skip method, with reference to FIGS. 11 and 12, the controller is configured to perform the following steps.

S51: receiving a selection of a first access entry presented on a first screensaver interface, and generating an instruction for interface skipping based on the selection of the first access entry.

While the screensaver is displaying on the display, the display will display the screensaver view, that is, the display will cycle through each screensaver interface. If the user is interested in a presentation material displayed on a certain screensaver interface and wants to view the display details of this presentation material, the user can click the access entry on this screensaver interface through the remote control to cause the display to skip to the display detail information.

In some embodiments, referring to (a) in FIG. 12, the user can click the access entry ACn on the screensaver interface SCn via a remote control to view the display detail information corresponding to the presentation material Pn.

When a specified access entry on the specified screensaver interface is clicked via the remote control, the instruction for interface skipping will be generated. The instruction is used to indicate that the screensaver view presented on the display skips to a display detail interface. The instruction is monitored by the screensaver application. If the screensaver application monitors that an access entry is selected or operated, the instruction for interface skipping is generated and sent to the controller to realize an interface skipping by the controller.

In some embodiments, in order to ensure that the screensaver view is displayed on the display and the display detail interface is retrieved for display at the same time, the controller will call the HISDK interface, which is an asynchronous interface and is capable of realizing parallel processing of two processes, that is, the screensaver view remains being displayed on the display, and the background calls the display detail interface at the same time, so as to prevent the situation where the previous application interface is exposed and displayed on the display to affect the user experience since the screensaver exits display immediately after the user clicks the access entry based on Android native mechanism.

S52: in response to the instruction for interface skipping, obtaining display information of a first presentation material displayed on the first screensaver interface.

After receiving the instruction for interface skipping sent by the screensaver application, the controller is configured to obtain the display information of a first presentation material presented on the first screensaver interface in order to open the content of the first presentation material displayed on the first screensaver interface.

The display information includes a packet name of the first presentation material and a skip link. The package name of the first presentation material is used to indicate the name of the presentation material content, and the skip link is an access address for viewing the presentation material content.

In some embodiments, in order to ensure the stability of the screensaver skipping, the controller can verify the validity of the instruction for interface skipping, and then perform the step of obtaining the display information of the first presentation material corresponding to the first access entry after the verification is passed.

S53: sending a skipping message carrying the display information to the transition application, wherein the transition application is configured to obtain the display detail interface corresponding to the display information.

In order to realize the screensaver skipping, that is, to realize the switch between the screensaver view presented on the display and the display detail interface, it is necessary to realize the switch by a general control module of both, that is, the skipping is implemented by the transition application.

The display detail interface is retrieved by the transition application based on the display information. When the controller needs to perform the screensaver skipping, it sends a skipping message in a form of broadcast communication to the transition application, and the skipping message carries the display information, that is, the display information that the user wants to view. The broadcast communication is a communication form between two applications. In other embodiments, the skipping message can be sent in other forms. The transition application can accurately retrieve the display detail interface according to the display information.

Figure 13:
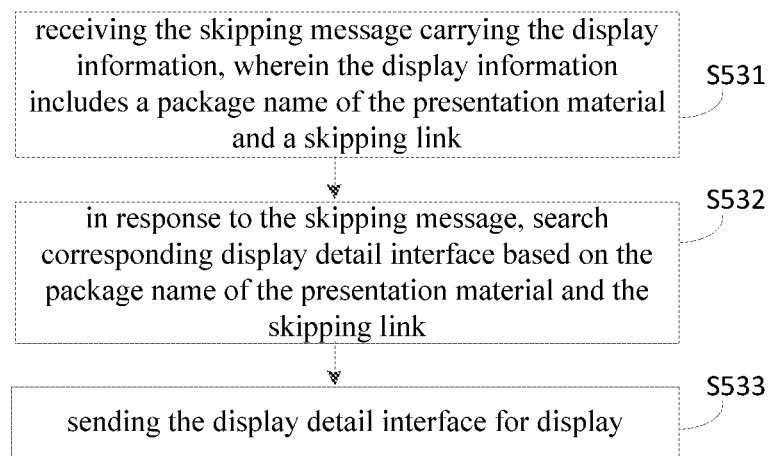
FIG. 13 provides a flowchart of a method for obtaining a display detail interface according to some embodiments.

FIG. 13 shows a flowchart of a method of obtaining a display detail interface according to some embodiments. In some embodiments, referring to FIG. 13, the transition application is further configured to perform the following steps when obtaining the display detail interface corresponding to the display information.

S531: receiving the skipping message carrying the display information, wherein the display information includes a package name of the presentation material and a skipping link.

S532: in response to the skipping message, search corresponding display detail interface based on the package name of the presentation material and the skipping link.

S533: sending the display detail interface for display.

After receiving the skipping message sent from the controller, the transition application finds the corresponding display detail interface from the background database according to the package name of the presentation material and the skipping link carried in the skipping message. The display detail interface found is the display detail interface that the user wants to view by clicking the first access entry in the first screensaver interface.

The transition application can accurately find the display detail interface that the user wants to view based on the package name of the presentation material and the skipping link, and then the transition application sends the display detail interface to the controller.

S54: receiving the display detail interface sent from the transition application, and presenting the display detail interface on the display.

S55: sending a notification for indicating skipping to a different interface to the screensaver application, wherein the screensaver application is configured to exit display of the screensaver view in response to the notification for indicating skipping to a different interface, wherein the notification for indicating skipping to a different interface is generated while the display detail interface is displaying on the display.

After receiving the display detail interface returned from the transition application, the controller can display the display detail interface on the display.

In some embodiments, referring to (a) and (b) in FIG. 12, the user clicks the access entry ACn on the screensaver interface SCn through the remote control, and the transition application obtains the display detail interface DIn. The controller displays the display detail interface DIn on the display, thus realizing the skip display of the display from the display screensaver view (presentation material Pn) to the display detail interface DIn.

When the transition application retrieves the display detail interface, the screensaver view that has been previously displayed remains displaying on the display, that is, the display does not exit from displaying the screensaver view upon receiving a selection of the access entry triggered by the user, so as to avoid the display of the previous application interface on the display which may affect the user experience.

In the process of starting to present the display detail interface on the display, the screensaver display interface needs to be invisible for the user to realize the exit of the screensaver view.

In order to enable the screensaver view to exit in time, the controller needs to send a notification for indicating skipping to a different interface to the screensaver application. The notification is generated when the display detail interface starts to appear on the display. The screensaver application can cause the screensaver view exit after receiving the notification.

In some embodiments, after causing the screensaver view exit display in response to the notification for indicating skipping to a different interface, the screensaver application is further configured to change the state of the screensaver display interface from a visible state to an invisible state in response to the notification, so that the screensaver view exist display on the screensaver display interface.

Both display and exit of the screensaver view are controlled by the screensaver application. Therefore, when the display detail interface is being shown on the display, it indicates that the current screensaver view can perform the exit operation. At this time, the screensaver application receives the notification sent from the controller, and changes the screensaver display interface in a blocked state to a transparent state again, that is, from the visible screensaver display interface to the invisible state interface, so as to realize the display exit of the screensaver view.

In some embodiments, in order to realize the exit display of the screensaver view, a WindowManager.removeView can be called to remove the screensaver view shown on the display and make the screensaver view exit from display on the screensaver display interface. Then, the display detail interface is presented on the display and visible for user.

When the transition application retrieves the display detail interface, it may fail to retrieve, resulting in a screensaver skipping failure. In this case, in order to ensure the normal display of the screensaver on the display, the controller is further configured to perform the following steps.

Step 561: in response to the display detail interface sent from the transition application being not received, a time period from a time point of receiving the instruction for interface skipping to the current time is recorded.

Step 562: in response to the time period exceeding a time threshold, whether the current screensaver view shown on the display exits is determined.

Step 563: if the current screensaver view does not exit, a notification for indicating exiting from a screensaver is sent to the screensaver application, the screensaver application is configured to: in response to the notification for indicating exiting from a screensaver, exit the display of the screensaver view, and display the previous application interface on the display.

The transition application fails to call the display detail interface, so that the controller is unable to receive the display detail interface and display it on the display. In this case, the controller adds time threshold countdown to the screensaver, that is, a time period from the initial time when the controller receives the instruction for interface skipping to a current time when the display detail interface is not received.

In some embodiments, the time period is a duration from a time when the access entry is operated or selected by a user to the current time. If the time period exceeds the time threshold, the skipping failure occurs, wherein the time threshold is used to countdown. For example, the countdown time threshold can be set to 2 seconds. If the period starting from the moment the access entry is selected reaches 2 s, whether the screensaver view exits is checked after 2s.

If the current screensaver view shown on the display does not exit display, the notification for indicating exiting from the screensaver is generated and sent to the screensaver application, so that the screensaver application will exit the display of the screensaver view. And then, the previous application interface appears on the display.

When the transition application retrieves the display detail interface, a situation where the interface retrieved by the transition application is not the display detail interface, but a system interface. However, the life cycle of the system interface cannot be monitored, that is, it is impossible to know when the system interface is retrieved, and it is impossible to know when to exit the display of the screensaver view. Therefore, in order to ensure the normal display of the screensaver, the controller is further configured to perform the following steps.

Step 571: if the skipping interface corresponding to the instruction for interface skipping is not a desired display detail interface, a time period from the initial time of receiving the instruction for interface skipping to the current time is recorded.

Step 572: if the time period exceeds a time threshold, whether the current screensaver view shown on the display exits is determined.

Step 573: if the current screensaver view does not exit, a notification for indicating exiting from a screensaver is sent to the screensaver application, the screensaver application is used to make the screensaver view exit display in response to the notification for indicating exiting from a screensaver, and present a skipping interface on the display.

When the skipping interface retrieved by the transition application according to the instruction for interface skipping is not a desired display detail interface corresponding to the selected access entry but some other interface, in order to ensure the normal display of the screensaver, the controller adds countdown logic to the screensaver, that is, a time period from the initial time when the controller receives the instruction for interface skipping to a current time when the display detail interface is not received.

In some embodiments, the time period is a period from the time when the access entry is selected to the current time. If the time period exceeds the countdown threshold, the skipping failure occurs. For example, the time threshold for countdown can be set to 2 s. If the countdown starting from the moment the access entry is selected by a user reaches 2 s, whether the screensaver view exits is checked after 2s.

If the current screensaver view on the display does not exit display, the notification for indicating exiting from a screensaver is generated and sent to the screensaver application, so that the screensaver application will exit the display of the screensaver view. And then, the interface for skipping to appears on the display.

It can be seen that for the display apparatus according to the embodiments of the disclosure, when the screensaver skips, the controller receives an instruction for interface skipping generated when an access entry is selected, and then send a skipping message carrying the display information to the transition application, and the transition application is used to obtain the display detail interface corresponding to the display information. When the controller presents the display detail interface on the display, the display sends a notification for indicating exiting from a screensaver to the screensaver application to make the screensaver view exit display. It can be seen that when the screensaver skips, the display detail interface that the user wants to view is presented on the display first, and then the screensaver view exits display to avoid exposing the previous application interface when the screensaver skips to display, and the user experience is not affected.

It can be seen that for some display apparatuses according to the embodiments of the disclosure, when the screensaver is displayed, the screensaver application configured in the controller creates the screensaver display interface and displays it on the display, then creates the screensaver view including a presentation material and an access entry, and adds the screensaver view to the screensaver display interface to block the previous application interface already shown on the display prior to starting the screensaver. During screensaver skipping, the controller receives the instruction for interface skipping generated when an access entry is selected by a user, and then sends a skipping message carrying the display information to the transition application, and the transition application obtains the display detail interface corresponding to the display information. When the display detail interface is shown on the display, the controller sends a notification for indicating exiting from a screensaver to the screensaver application to make the screensaver view exit display. It can be seen that for the display apparatus according to the disclosure, the screensaver display interface is created by the screensaver application, which can determine whether the screensaver skipping is successful; when the screensaver skips, the display detail interface that the user wants to view is presented on the display firstly, and then the screensaver view exits display to avoid exposing the previous application interface during screensaver skipping, and the user experience is not affected.

In some embodiments, the disclosure also provides a nonvolatile computer storage media, in which the computer storage medium can store programs, and the execution of the programs causes a processor to perform some or all of the steps in the embodiments of the screensaver display method and the screensaver skipping method according to the disclosure. The storage medium can be a magnetic disc, an optical disc, a read-only memory (ROM) or a random access memory (RAM), etc.

For the convenience of explanation, the above description has been made in combination with specific embodiments. However, the above exemplary discussion is not intended to be exhaustive or to limit the embodiments to the specific form of the above disclosure. According to the above teaching, a variety of modifications can be obtained. The selection and description of the above embodiments is to better explain the principles and practical applications, so that those skilled in the art can better use the embodiments and various modified embodiments suitable for specific use.

What is claimed is:

1. A display apparatus, comprising:
    a display, configured to display an image;
    a controller in connection with the display and configured to:
        display a first interface on the display;
        in response to no operation for the first interface reaching a first time threshold, create a screensaver display interface by a screensaver application in the display apparatus, wherein the screensaver display interface is transparent with respect to the first interface;
        present the screensaver display interface on the display without blocking the first interface presented on the display;
        create a screensaver view comprising a plurality of screensaver interfaces by the screensaver application, wherein a first screensaver interface of the plurality of screensaver interfaces comprises a first access entry and a first presentation material; and
        present the first screensaver interface in the screensaver view on the screensaver display interface to block the first interface, wherein the first access entry and the first presentation material are visible for a user and the first access entry is available for selection by the user.

2. The display apparatus according to claim 1, wherein the controller is further configured to:
    create a blank view, and add a plurality of image controls to the blank view; and
    obtain a plurality of presentation materials, and add the plurality of presentation materials to the plurality of image controls to form the plurality of screensaver interfaces, wherein the plurality of presentation materials and the plurality of image controls are in one-to-one correspondence.

3. The display apparatus according to claim 1, wherein the first access entry is configured to point to access detail information of the first presentation material.

4. The display apparatus according to claim 3, wherein the controller is further configured to:
    in response to a selection of the first access entry during presentation of the first screensaver interface, present a first display detail interface for showing detail information of the first presentation material on the display and notify the screensaver application to exit from the first screensaver interface.

5. The display apparatus according to claim 4, wherein the controller is further configured to:

in response to the selection of the first access entry, generate an instruction for interface skipping;

in response to the instruction for interface skipping, obtain display information of the first presentation material;

send a message carrying the display information of the first presentation material to a transition application in the display apparatus; and obtain the first display detail interface corresponding to the display information of the first presentation material by the transition application.

6. The display apparatus according to claim 5, wherein the controller is further configured to:

obtain the first display detail interface from the transition application;

present the first display detail interface on the display; and send a notification for indicating skipping to a different interface to the screensaver application to cause the screensaver application to exit from the first screensaver interface.

7. The display apparatus according to claim 5, wherein the display information of the first presentation material comprises:

a package name of the first presentation material; and a skipping link for pointing to the first presentation material.

8. The display apparatus according to claim 6, wherein the controller is further configured to;

in response to not receiving the first display detail interface, record a time period from a moment of receiving the instruction for interface skipping to a current time;

in response to the time period reaching a first threshold, determine whether the first screensaver interface exits;

in response to the first screensaver interface not exiting, send a notification for indicating exiting from a screensaver to the screensaver application to cause the screensaver application to exit from the first screensaver interface.

9. The display apparatus according to claim 6, wherein the controller is further configured to:

in response to receiving another interface rather than the first display detail interface, record a time period from a moment of receiving the instruction for interface skipping to a current time of the display apparatus;

in response to the time period reaching a second threshold, determine whether the first screensaver interface exits;

in response to the first screensaver interface not exiting, send a notification for indicating exiting from a screensaver to the screensaver application to cause the screensaver application to exit from the first screensaver interface.

10. A screensaver display method for a display apparatus, comprising:

displaying a first interface on a display of the display apparatus;

in response to no operation for the first interface reaching a first time threshold, creating a screensaver display interface by a screensaver application in the display apparatus, wherein the screensaver display interface is transparent with respect to the first interface;

presenting the screensaver display interface on the display without blocking the first interface presented on the display;

creating a screensaver view comprising a plurality of screensaver interfaces by the screensaver application, wherein a first screensaver interface of the plurality of screensaver interfaces comprises a first access entry and a first presentation material; and presenting the first screensaver interface in the screensaver view on the screensaver display interface to block the first interface, wherein the first access entry and the first presentation material are visible for a user and the first access entry is available for selection by the user.

11. The screensaver display method according to claim 10, further comprising:

creating a blank view, and adding a plurality of image controls to the blank view; and obtaining a plurality of presentation materials, and adding the plurality of presentation materials to the plurality of image controls to form the plurality of screensaver interfaces, wherein the plurality of presentation materials and the plurality of image controls are in one-to-one correspondence.

12. The screensaver display method according to claim 10, wherein the first access entry is configured to point to access detail information of the first presentation material.

13. The screensaver display method according to claim 12, further comprising:

in response to a selection of the first access entry during presentation of the first screensaver interface, presenting a first display detail interface for showing detail information of the first presentation material on the display and notify the screensaver application to exit from the first screensaver interface.

14. The screensaver display method according to claim 13, further comprising:

in response to the selection of the first access entry, generating an instruction for interface skipping;

in response to the instruction for interface skipping, obtaining display information of the first presentation material;

sending a message carrying the display information of the first presentation material to a transition application in the display apparatus; and obtaining the first display detail interface corresponding to the display information of the first presentation material by the transition application.

15. The screensaver display method according to claim 14, further comprising:

obtaining the first display detail interface from the transition application;

presenting the first display detail interface on the display; and sending a notification for indicating skipping to a different interface to the screensaver application to cause the screensaver application to exit from the first screensaver interface.

16. The screensaver display method according to claim 14, wherein the display information of the first presentation material comprises:

a package name of the first presentation material; and a skipping link for pointing to the first presentation material.

17. The screensaver display method according to claim 15, further comprising:

in response to not receiving the first display detail interface, recording a time period from a moment of receiving the instruction for interface skipping to a current time of the display apparatus;

in response to the time period reaching a first threshold, determining whether the first screensaver interface exits;

in response to the first screensaver interface not exiting, sending a notification for indicating exiting from a screensaver to the screensaver application to cause the screensaver application to exit from the first screensaver interface.

18. The screensaver display method according to claim 15, further comprising:

in response to receiving another interface rather than the first display detail interface, recording a time period from a moment of receiving the instruction for interface skipping to a current time;

in response to the time period reaching a second threshold, determining whether the first screensaver interface exits;

in response to the first screensaver interface not exiting, sending a notification for indicating exiting from a screensaver to the screensaver application to cause the screensaver application to exit from the first screensaver interface.

* * * * *